UNITED STATES PATENT OFFICE.

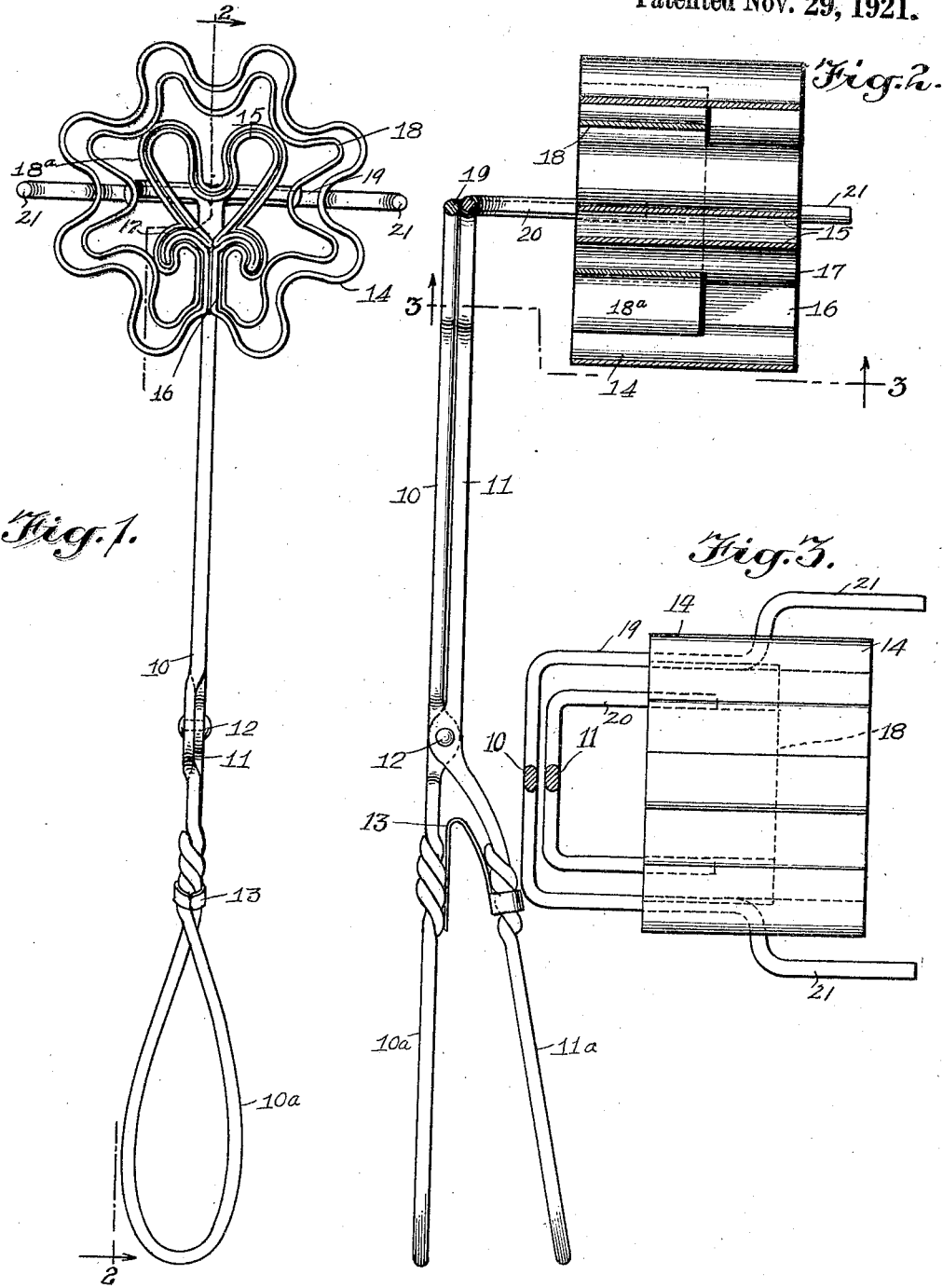

KATE A. WEISGARBER, OF VIBANK, SASKATCHEWAN, CANADA.

COOKING DEVICE.

1,398,757.  Specification of Letters Patent.  Patented Nov. 29, 1921.

Application filed October 28, 1920. Serial No. 420,188.

*To all whom it may concern:*

Be it known that I, KATE A. WEISGARBER, a citizen of Dominion of Canada, and a resident of Vibank, in the Province of Saskatchewan, and Dominion of Canada, have invented a new and Improved Cooking Device, of which the following is a full, clear, and exact description.

My invention relates to a device for use in making cookies and has for its object to produce a device for the indicated purpose, so constructed and arranged that the device, heated by plunging it into hot fat, may be dipped into the paste for picking up the desired quantity, and the article be quickly cooked by again plunging the device with the paste thereon into the hot fat; a further object being to so form the device that the elements may be operated for ejecting the cooked article.

Reference is to be had to the accompanying drawing, it being understood that the drawing is merely illustrative of one example of the invention.

Figure 1 is a front elevation of my device.

Fig. 2 is a sectional side elevation as indicated by line 2—2, Fig. 1.

Fig. 3 is a section on line 3—3, Fig. 2.

In carrying out my invention in accordance with the illustrated example a pair of handle elements 10, 11, is provided, pivotally connected between their ends at 12, the handle parts 10ª, 11ª, diverging and having between the same a suitable spring 13 tending to separate the handle parts.

Rigid with one handle 10 is the body 14 of the cooky former or mold which will have any suitable shape to give any particular shape to the cooky. In the example shown the body 14 is crimped or corrugated to give a corresponding form to the cooky. Within the body 14 and rigid therewith and with the handle 10 is an inner mold element 15 for molding and carrying the paste and giving shape to the cooky. Said inner element 15 is so formed as to coact and be coördinated with the crimped or other shape of the body 14 at the exterior, the illustrated form being generally of heart shape, supported on a shank 16 rigid with the exterior portion of the body. In addition to the general heart shape of the element 15 it has in the illustrated form curved side members 17 to coact with the general crimped shape of the adjacent portion of the body at the outer side. The general result of forming the body 14 with the inner element 15 described will be to give general crimped or corrugated form to the cooky as the paste enters between the inner element 15 and the outer portion of the body and will conform generally to the intermediate space.

In connection with the molding and cooking device described and comprising the outer portion 14 of the body and the inner element 15, I employ an ejector designated generally by the numeral 18 and movable in the body to an inner position to afford entrance of the paste, or to an outer position for ejecting the cooked article. The body 14 having the element 15 rigid therewith is itself rigid with the handled element 10 through any suitable connecting means, there being shown a bow shaped member 19 extending laterally from the forward end of said handled element. Similarly bow shaped element 20 rigid with the handled element 11 is rigid with the ejector 18. Said ejector 18 follows generally the shape of the body 14 and its inner element 15 and therefore in the present example it is crimped or corrugated exteriorly to follow generally the lines of body 14, and it is shaped at its interior portion 18ª to follow approximately the lines of the inner element 15.

In use, the body with the ejector in the rearward position, under the action of the spring 13, is dipped into a pan of hot fat for heating the device, then removed from the fat and dipped into the paste whereby to pick up a sufficient quantity of the latter, the device being again plunged into the hot fat. The cooking having been completed, which takes but very short time owing to the pre-heating, the handled portions 10ª, 11ª, are pressed together to give relative movement to the body and ejector whereby the latter will be caused to move forwardly in the body and eject the cooked article, whereupon the cooking process is repeated for the forming of another cooky.

The members 14, 15, 16 and 17 are preferably made in one piece, that is to say, from a single length of sheet material shaped to provide the several members, the ends or adjacent edges of the sheet being joined at any suitable point in the device as for instance at the outer end of one of the members 17 as indicated at 17ª, Fig. 1.

I provide members 21 at the sides of the mold at the exterior and extending forwardly beyond the front of the mold which may constitute legs or supporting members for the material to maintain the latter out of contact with a table, dish, stove, or the like, on which the device is placed. Said members 21 are rigid with the body in any suitable manner, preferably by forming them continuous with the sides of the loop 19.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

I claim:

1. A cooking device of the class described including a body adapted to hold and give shape to the paste to be cooked and comprising inner and outer members in fixed spaced relation to each other; and an ejector disposed between the inner and outer members of the body and movable rearwardly therein to an inner inoperative position, or forward therein for ejecting the cooked article.

2. A cooking device of the class described including a body adapted to hold and give shape to the paste to be cooked and comprising inner and outer members in fixed spaced relation to each other, and an ejector disposed between the inner and outer members of the body and movable rearwardly therein to an inner inoperative position, or forward therein for ejecting the cooked article, together with pivotally connected handled elements carrying respectively the said body and the said ejector.

3. A cooking device of the class described including a body adapted for holding and giving shape to the paste to be cooked, a movable ejector in said body, handle members for manipulating the device and for causing relative movement to the body and ejector, and members projecting beyond the front of the body to constitute sustaining means for the body when the device is placed on a support.

Mrs. KATE A. WEISGARBER.